Jan. 21, 1969   V. K. PRYCE   3,422,485
DETACHABLE HANDLES
Filed April 18, 1966   Sheet 1 of 2
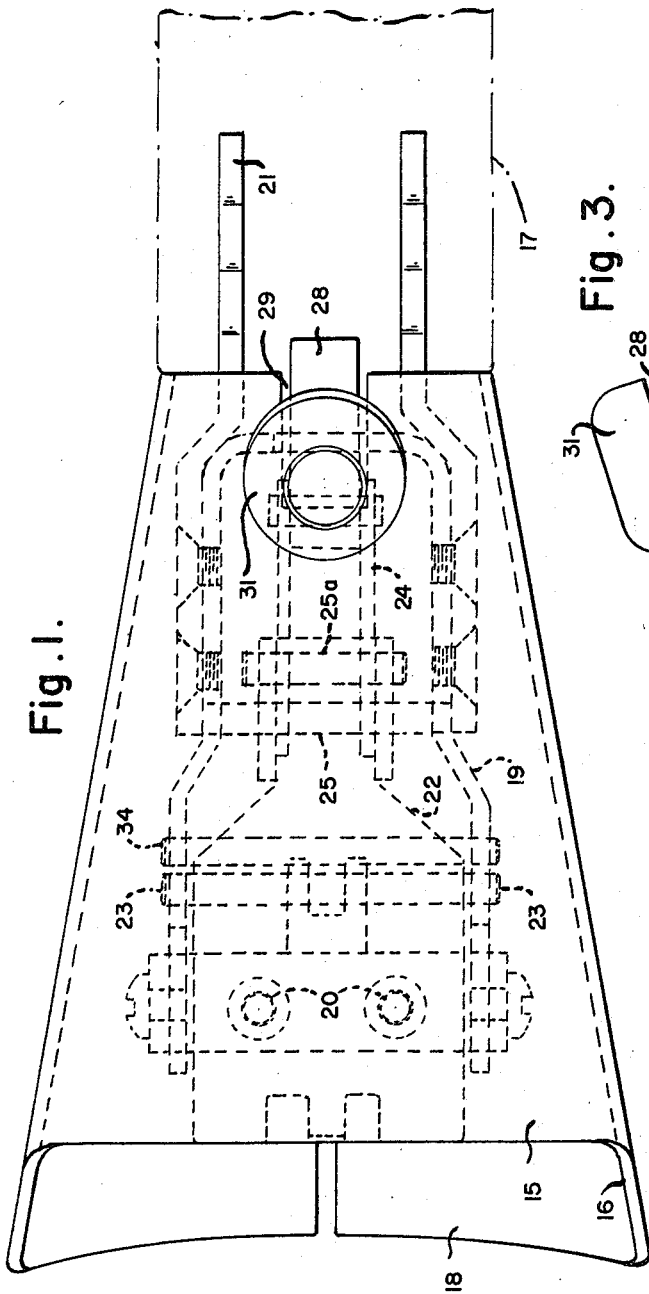
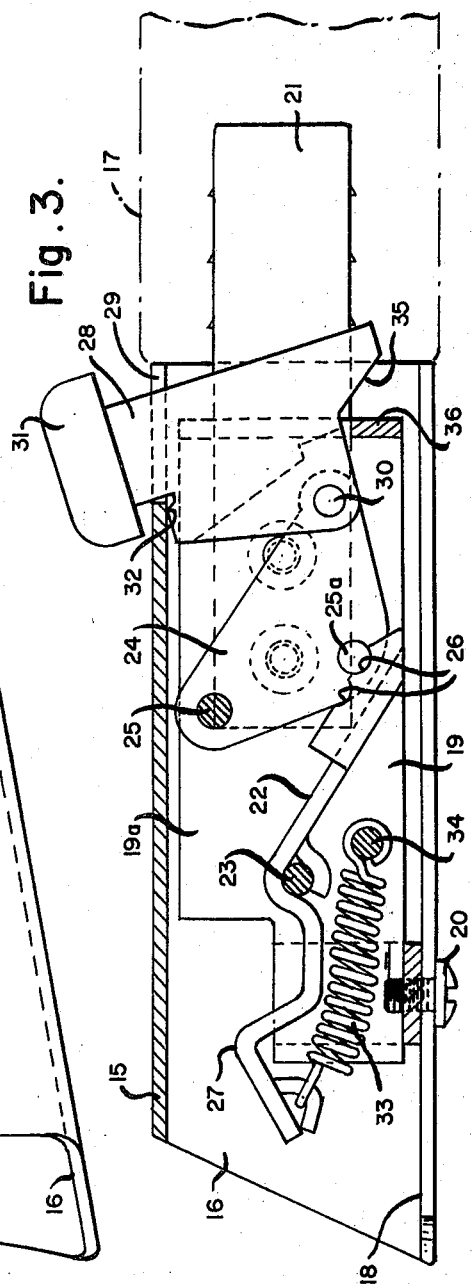
INVENTOR
Vaughn K. Pryce
Hooper, Leonard & Bull
his Attorneys INVENTOR
Vaughn K. Pryce

United States Patent Office 3,422,485
Patented Jan. 21, 1969

3,422,485
DETACHABLE HANDLES
Vaughn K. Pryce, 417 4th St.,
Derry, Pa. 15627
Filed Apr. 18, 1966, Ser. No. 543,131
U.S. Cl. 16—114  4 Claims
Int. Cl. E05b 1/00; A47l 45/10; A47b 95/02

ABSTRACT OF THE DISCLOSURE

A detachable handle is provided for cooking vessels having a projecting lug made up of a hand gripping portion including a gripping jaw, a movable gripping jaw pivoted intermediate its ends on the hand gripping portion, a rib on one end of the movable jaw, a stepped cam on the movable gripping jaw opposite the rib and adjacent the hand gripping portion, lever means having a cam engaging means adapted to ride on a stepped cam on the gripping jaw and provided with a vertical lever extending through the fixed gripping jaw adapted to move horizontally and vertically to move the end of the movable jaw toward and away from the projecting lug, resilient means biasing the movable jaw to an open position and dog means on the lever releasably engaging the fixed jaw when the movable jaw is moved toward the fixed jaw.

---

This invention relates to detachable handles and particularly to a handle adapted to be removably applied to a fry pan, casserole or like cooking vessel having one or more outwardly extending lugs or lips. There are on the market a variety of glass and ceramic cooking vessels which have a flat bottom and an upwardly extending flange defining the body of the vessel which flange has on its upper edge at least one outwardly extending lug or lip. Such cooking vessels are made and sold by Corning, Anchor Hocking and Owens-Illinois glass companies.

It is essential in a detachable handle for the service here contemplated, that the handle tightly engage the lug or lip without scoring or otherwise damaging the glass or ceramic surface or otherwise setting up strains. It is also essential that the handle hold the vessel sufficiently tightly to permit its being turned from the horizontal to the vertical plane without loss of engagement.

I have invented a detachable handle which when once connected to the cooking vessel cannot be accidentally disconnected or removed. The handle of my invention will not score or otherwise injure the glass surface of the lug or lip. A very significant feature of my invention is that it will vary the grasping opening to accommodate reasonable variations in the thickness of the lug so that the lug is always firmly engaged. This feature is unique in the structure of my invention and cannot be accomplished by any detachable handle presently available to my knowledge.

In a preferred embodiment of my invention I provide a detachable handle of the character described comprising a hand gripping portion, a fixed gripping jaw integral with the hand gripping portion, said fixed jaw having depending spaced flanges at opposite sides thereof, a movable gripping jaw pivoted intermediate its ends in a housing fixed within said fixed jaw, said movable gripping jaw having a rib at one end adapted to engage the lug of a cooking vessel and a stepped cam at the opposite end, resilient means acting on the movable jaw urging it to the open position, lever means pivoted between the side walls of the movable jaw housing adjacent the stepped cam having a cam engaging member adapted to ride on the stepped cam, said lever means extending through an opening in the fixed gripping jaw and adapted to be moved vertically and horizontally therein to move the lip end of the movable jaw remote from the lever toward and away from the end of the fixed jaw remote from the hand gripping portion. Preferably the cam engaging member is a transverse pin through said lever adapted to ride on identical spaced apart parallel stepped cam surfaces on opposite sides of the movable jaw means.

In the foregoing general description I have set out certain objects, advantages and purposes of my invention. Other objects, advantages and purposes of my invention will be apparent from a consideration of the following description and the accompanying drawings in which:

FIGURE 1 is a top plan view of the detachable handle according to my invention;

FIGURE 3 is an enlarged sectional view of the locking mechanism of the handle of FIGURES 1 and 2.

Figure 2:
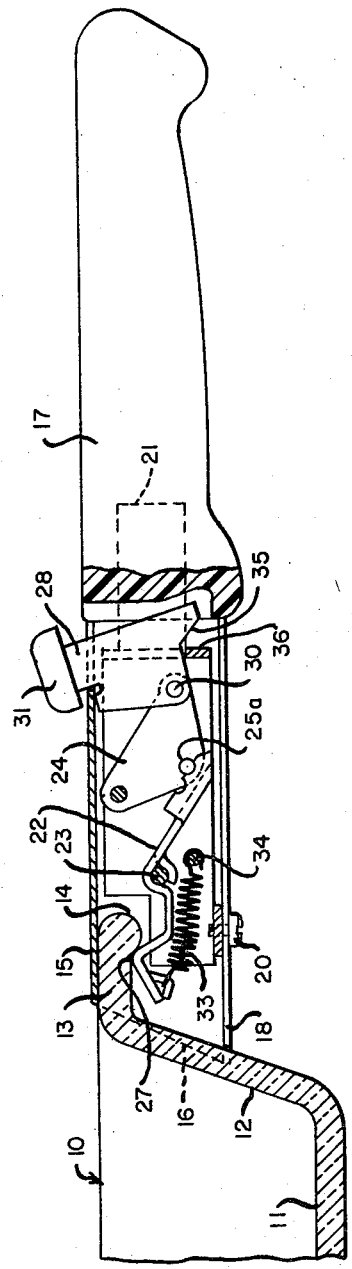
FIGURE 2 is a side elevational view partly in section of a handle according to my invention showing the handle in locking engagement with a cooking vessel.

Referring to the drawings I have illustrated a conventional ceramic fry pan 10 having a bottom 11 and an upstanding flange 12 defining the fry pan. An integral lug 13 extends from the upper edge of the flange 12 generally parallel to the bottom 11 of the pan. The lug 13 is provided with a depending lip 14 at its outermost extremity.

The detachable handle of my invention is provided with an upper fixed jaw 15 having depending spaced flanges 16 at each side integral with a hand gripping portion 17.

The flanges 16 may be provided with inturned portions 18 welded together for rigidity if desired. A jaw housing 19 is fixed within fixed jaw 15 by screws 20 and provided with handle props 21. A movable gripping jaw 22 is pivoted intermediate its ends on a pivot rod 23 fixed in the sidewalls 19a of housing 19. An operating lever 24 is pivoted on a shaft 25 mounted in sidewalls 19a of housing 19. The lever 24 is made up of two spaced apart generally triangular members carrying a cam operating bar 25a acting on cam slots 26 on the end of movable jaw 22 opposite the gripping rib 27. A lever 28 extends vertically through slot 29 in fixed jaw 15. A pin 30 is provided in lever 28 at its lower end interconnecting the side members of lever 24. This pin 30 is adapted to pivot the lever 28 in lever 24. The lever 28 is provided with a finger pad 31 for urging the lever downwardly and with a dog 32 engageable beneath fixed jaw 15. A spring 33 is fixed at one end to a pin 34 extending between the sidewalls 19a of housing 19 and at the other end with the end of movable jaw 22 adjacent rib 27.

The handle of my invention is placed with the fixed jaw 15 on top of the lug 13 of the fry pan and the lever 28 is depressed and moved forwardly toward the lug 13 of the fry pan with the thumb of the user so that the pin 25a moves along the stepped cams 26 and dog 32 engages beneath the edge of slot 29. This moves the rib 27 upwardly against lug 13 behind lip 14 by pivoting the movable jaw on pivot rod 23. In this locked position the fry pan may be lifted and tipped or turned with safety just as a conventional pan with an integral fixed handle.

The handle is removed by simply moving the lever 28 rearwardly by pressure on pad 31 away from the pan thus causing dog 32 to be disengaged from beneath the fixed jaw. This causes pin 25a to move upwardly from the stepped cams while the angled surface 35 rides on spacer 36 guiding the lever 28 upwardly and rearwardly and releasing the rib 27 by lowering it from the lug 13 through the action of spring 33.

While I have illustrated and described a presently preferred embodiment of my invention, it will be understood that this invention may be otherwise embodied within the scope of the following claims.

I claim:
1. A detachable handle for cooking utensils having a projecting lug comprising a hand gripping portion, a fixed gripping jaw integral with the hand gripping portion, said fixed jaw having depending spaced flanges at opposite sides thereof, a jaw housing fixed within said fixed jaw, a movable gripping jaw pivoted intermediate its ends in the sidewalls of said housing, a rib on one end of the movable jaw remote from the hand gripping portion, a stepped cam on the movable gripping jaw opposite the rib and adjacent the hand gripping portion, lever means pivoted in the housing adjacent the hand gripping portion and having cam engaging means adapted to ride on said stepped cam, said lever means having a vertically moving lever extending through an opening in the fixed gripping jaw and adapted to be moved horizontally and vertically therein to move the end of the movable jaw remote from the lever toward and away from the end of the fixed jaw remote from the hand gripping portion, resilient means biasing the movable jaw to an open position and dog means on the lever releasably engaging the fixed jaw when the movable jaw is moved toward the fixed jaw.

2. A detachable handle as claimed in claim 1 wherein the stepped cam means is made up of a pair of stepped cams, one on each side of the movable jaw.

3. A detachable handle for cooking utensils having a projecting lug comprising a hand gripping portion, a fixed gripping jaw integral with the hand gripping portion, said fixed jaw having depending spaced flanges at opposite sides thereof, a jaw housing within said fixed jaw, a movable gripping jaw pivoted intermediate its ends in the sidewalls of said jaw housing, a stepped cam on the movable jaw adjacent the hand gripping portion, and lever means pivoted in the housing adjacent the hand gripping portion and having cam engaging means adapted to ride on said stepped cam, said lever means having a portion extending through an opening in the fixed gripping jaw and adapted to be moved horizontally and vertically therein to move the end of the movable jaw remote from the lever toward and away from the end of the fixed jaw remote from the hand gripping portion and a dog portion releasably engaging the fixed jaw when the movable jaw is moved toward the fixed jaw, and resilient means biasing the movable jaw.

4. A detachable handle as claimed in claim 3 wherein the stepped cam means is made up of a pair of stepped cams, one on each side of the lever opening in the fixed jaw between which said lever moves.

References Cited

UNITED STATES PATENTS

| | | | |
|---|---|---|---|
| 3,272,547 | 9/1966 | Pryce | 16—114 |
| 3,270,387 | 9/1966 | Ziegler et al. | 24—230.1 |

BOBBY R. GAY, *Primary Examiner.*

DORIS L. TROUTMAN, *Assistant Examiner.*

U.S. Cl. X.R.

16—110